(12) United States Patent
Jaipuria

(10) Patent No.: US 7,854,987 B2
(45) Date of Patent: Dec. 21, 2010

(54) EXTRUSION COATED BIAXIALLY ORIENTED POLYPROPYLENE FILM

(75) Inventor: Ashok Jaipuria, New Delhi (IN)

(73) Assignee: Cosmo Films Ltd., New Delhi (IN)

( * ) Notice: Subject to any disclaimer, the term of this patent is extended or adjusted under 35 U.S.C. 154(b) by 0 days.

(21) Appl. No.: 11/809,362

(22) Filed: May 31, 2007

(65) Prior Publication Data

US 2008/0299362 A1      Dec. 4, 2008

(51) Int. Cl.
*B32B 27/00*         (2006.01)

(52) U.S. Cl. .................... 428/212; 428/411.1; 428/354; 428/213; 428/461; 428/515; 428/910; 264/210.6; 264/173.12; 264/173.11

(58) Field of Classification Search ................. 428/212, 428/411.1, 354, 213, 461, 515, 910; 264/210.6, 264/173.12, 173.11
See application file for complete search history.

(56) References Cited

U.S. PATENT DOCUMENTS

| | | | | |
|---|---|---|---|---|
| 3,154,461 | A * | 10/1964 | Johnson | 428/159 |
| 5,552,011 | A * | 9/1996 | Lin | 156/244.17 |
| 5,620,095 | A * | 4/1997 | Delmore et al. | 206/438 |
| 5,792,549 | A * | 8/1998 | Wilkie | 428/215 |
| 5,830,545 | A * | 11/1998 | Frisk | 428/34.7 |
| 5,981,047 | A * | 11/1999 | Wilkie | 428/215 |
| 6,190,760 | B1 * | 2/2001 | Nagai et al. | 428/213 |
| 6,364,988 | B1 * | 4/2002 | Lin | 156/244.17 |
| 6,368,543 | B1 * | 4/2002 | Lin | 264/414 |
| 6,379,605 | B1 * | 4/2002 | Lin | 264/414 |
| 6,423,420 | B1 * | 7/2002 | Brant et al. | 428/516 |
| 6,913,817 | B2 * | 7/2005 | Klein et al. | 428/323 |
| 7,281,360 | B1 * | 10/2007 | Larimore et al. | 53/452 |

* cited by examiner

*Primary Examiner*—David R Sample
*Assistant Examiner*—Lawrence D Ferguson
(74) *Attorney, Agent, or Firm*—Ladas and Parry LLP

(57) ABSTRACT

The present invention relates to a thermal laminating film comprising: a base layer of biaxially oriented polypropylene (BOPP) film and a thermal laminating layer disposed on the outer surface of the base layer, wherein the said thermal laminating layer comprises 100% by weight of an ethylene vinyl acetate copolymer containing from 10% to 30% by weight of vinyl acetate units and having melt flow index of 18 to 30 or polyethylene or EAA or a blend of all these.

12 Claims, 2 Drawing Sheets

Layer structure of Thermal film

TREATED, MATTE/SILKY MATTE/GLOSSY OPP LAYER (Surface 4)
ADDITIVE MODIFIED OPP LAYER (Surface 3)
SPECIAL OPP LAYER FOR BONDING (Surface 2)
ADHESIVE LAYER (Surface 1)

Layer structure of Thermal film

EXTRUSION COATED BIAXIALLY ORIENTED POLYPROPYLENE FILM

FIELD OF INVENTION

This invention relates to an extrusion coated biaxially oriented polypropylene film for thermal lamination on various paper based printed substrates. Thermal lamination by using this film involves a process wherein two webs are combined under pressure and temperature. As this process eliminates the use of solvent, it is eco-friendly. This is made possible by having a low melting polymer coated on to one of the web and this layer combines both the webs.

BACKGROUND OF THE INVENTION

Thermal or heat activated laminating films are constructed of a layer of Biaxially oriented polypropylene base film and a layer of adhesive resin (Ethylene Vinyl Acetate (EVA) or Polyethylene or Ethylene Acrylic Acid (EAA) or a blend of all these), bonded together. During the lamination process, the adhesive resin is softened or liquefied and permanently bonded to the document. Once liquefied, the adhesive is spread across the surface and with pressure, forced into the pores of the paper. The adhesive then hardens as it cools creating a permanent bond between paper and film.

Pressure Sensitive laminating films are often referred to as cold films. The reason is that they require no heat or very limited amount of heat to adhere to any particular document during the laminating or mounting process. The adhesive layer in cold film is constantly in a tacky state since no heat is used in the sealing process (only pressure). This gives the need for a paper or film liner, that keeps the film from adhering to itself when it is rolled. Pressure sensitive laminating films will adhere to almost any substrate but is best used for heat sensitive or previously heat activated materials. These films work great for overlaminating and mounting on such substrates as gator board, foam board, wood, Plexiglass or delicate print materials such as photostats, transparencies, cyberchromes and thermal transfers.

Figure 2:
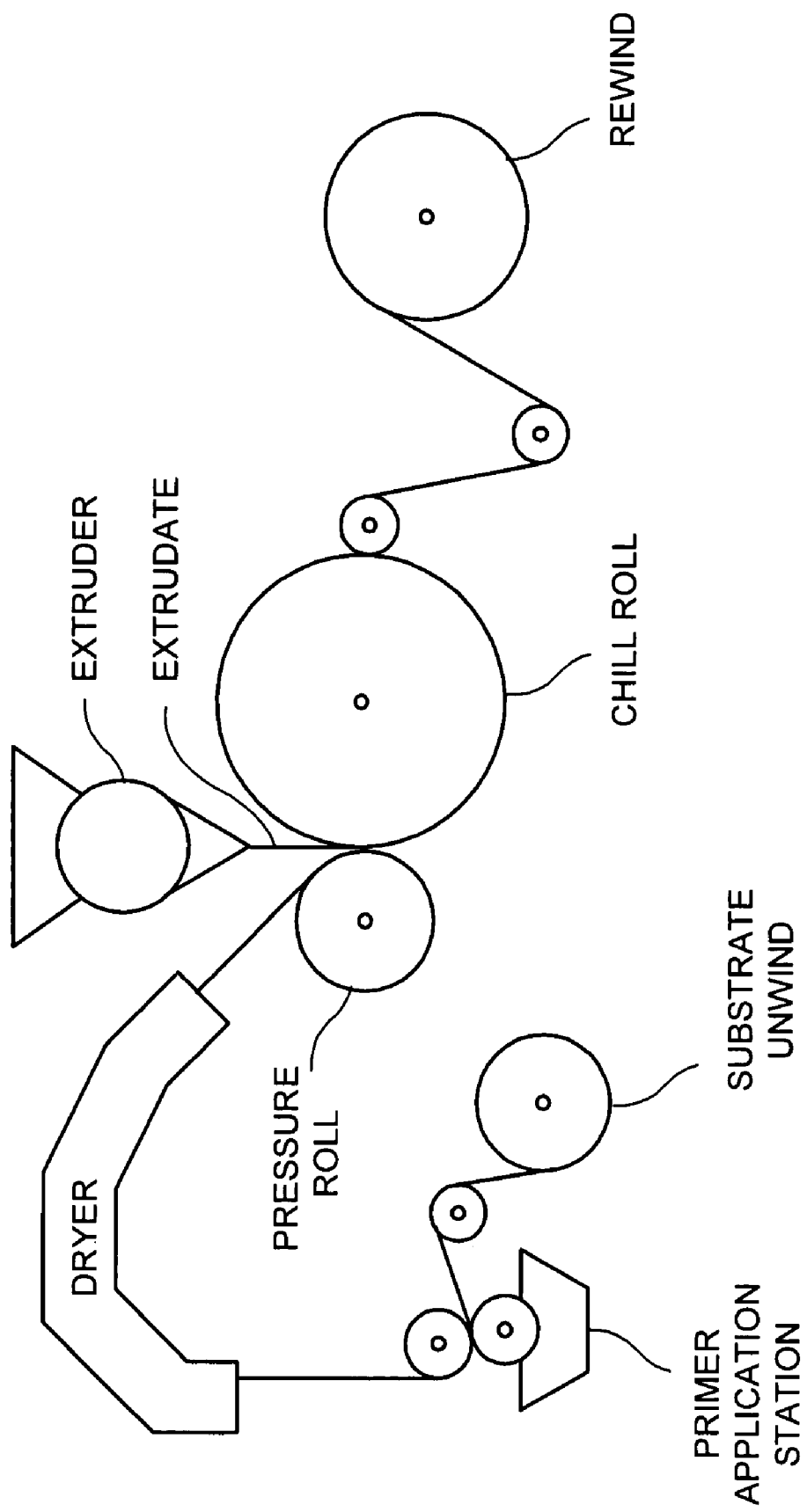

Extrusion coating is a variation of the extrusion process. In FIG. 2, a substrate comes in on the left, a primer is applied and cured, and another material is applied over that from the extruder.

Extrusion coating followed by lamination is used to protect printing. It puts a layer of material over the printed surface to prevent any scuffing or smearing. It can also be used to bond materials that can't be co-extruded, materials with very different melting points, or materials that can't be extruded like paper, foil, metalized films or oriented films.

Lamination is a process of pasting two different or similar substrates together to achieve hybrid properties. In case of book cover lamination, printed paper and plastic film are laminated to protect the paper against weather, water, stain and tear. This lamination is generally done by coating adhesive over plastic film and then laminating it with printed paper or paperboard. This process, which is called as "Wet Lamination" is widely used world over and predominantly in India. In USA and in few European countries, the process employed is different. Plastic films such as BOPP, Polyester or Nylon are extrusion coated with low density polyethylene (LDPE), ethylene vinyl acetate (EVA) or EAA or a blend of all these, etc. This coated film and printed paper are passed over heated rolls under pressure and thereby inducing lamination. This process is called "Thermolamination". Industry refers this as dry lamination.

Thermal laminating materials and methods are known for protecting printed substrates by adhering a protective thermoplastic polymer cover film or sheet to one or both of the major surfaces of a printed substrate. Thermal film lamination provides immediate benefits to printed materials-most notably, an attractive look and polished or a lacquered feel. With thermal lamination, printed materials enjoy greater durability. Unlike UV or other coatings, thermal lamination provides protection against scratching and smudging. The life of the printed materials is extended in a number of ways because thermal lamination make paper more tear resistant and protects inks on printed substrates.

Based on various applications, the following features are required in the film.

Film for thermal lamination should be made in both glossy & matte variance. Thicknesses for glossy should be 22-80 microns. The same should be for matte variance also.

Laminating surface should be low melting, polar & easy flowing. The opposite surface should be hot slip modified without any locking issue when laminated on both surfaces, good scuff resistance, good antistatic property to enable better & smooth runnability at elevated temperatures.

Unlike other finishes, thermal lamination is a very safe and waste free process. It does not emit harmful volatiles and other substances into the atmosphere. Accordingly, thermal lamination is a significant breakthrough in finishing practices and contributes greatly toward preserving the environment. Earlier, less productive solvent- and water-based systems are now being changed over to thermal lamination.

The process of thermal lamination uses heat, pressure and thermoplastic material to combine substrates without an in-line adhesive application. Webs of paper, paperboard, etc. are bonded with BOPP film using polyolefin thermoplastics as the bonding medium. Sufficient heat and pressure are momentarily introduced to nearly melt the thermoplastic surface at the laminating nip and create a mechanical bond. Such a coating material should also be able to make a very good bond with printed substrate, also. Thus, bonding is as much chemical as it is mechanical.

The laminating section of the roll fed thermal laminator consists of large diameter heated rolls, nip rolls, preheat rolls, idlers, spreader roll and chill rolls. The heated steel rolls are driven, and have a double-wall design, and are Teflon coated. This allows for a controlled, balanced flow of large volumes of heating media for uniform temperature and dwell time on the heated rolls. Electrical heating system is also available which is controlled by thermocouple inserted in to the rolls.

Films used in thermal lamination are run over web-driven, fixed-bow rolls, which keep them wrinkle free and flat as they enter the lamination nip. After the lamination is complete, the web is transported over two or three driven, double wall, flow-through, chrome-plated-steel chill rolls. The web is cooled to room temperature to solidify the thermoplastic layer and complete the bonding process.

PRIOR ART

A patent document WO 0140395 teaches a laminatory film for thermal adhesion to a substrate. This film comprises an over-laminated layer of a heat-sealeable film, a first adhesive layer of a low-density polyethylene or its copolymers contacting the overlaminate layer and a second layer contacting the first adhesive layer. The second adhesive layer comprises a material having an amount of maleic anhydride to increase adhesion of the second adhesive layer to the substrate. The over laminate layer is selected form polypropylene, nylon and polyethylene terephthalate.

The known films however suffer from drawback in that these require higher temperature for lamination, due to which it is not possible to do lamination at high speed and yet obtain a good bond strength. Further, higher laminating temperature affects the BOPP base film. The films having two layer of adhesives tend to make the film hazy.

OBJECTS OF THE INVENTION

In order to over come the drawbacks of the film known in the art the present invention has the following objects.

The principal object of the invention is to propose an extrusion coated Biaxially oriented polypropylene film for thermal lamination.

Another object of this invention is to propose a thermal lamination film which does not use a water based adhesive from lamination.

Yet another object of this invention is to propose a base film for thermal lamination coated with low melting thermoplastic without any primer to enable thermal lamination at lower temperature.

Further object of this invention is to propose a film for thermal lamination coated with a thermoplastic which is polar enough to allow chemical bond and adherence with paper substrates, ink formulations etc.

Yet further object of this invention is to propose a film for thermal lamination which is eco-friendly in that it does not release any effluent, gas, vapor, solvents etc. during thermal lamination.

Another object of this invention is to propose a film for thermal lamination which uses heat and pressure for lamination.

Other advantages and objects of invention will be apparent from the ensuing description. It is to be understood that the features and concepts of the invention can be adopted to various embodiments by making changes, modifications by those skilled in the art. Such variants are intended to be within the scope of the present invention.

STATEMENT OF THE INVENTION

According to the present invention there is provided a thermal laminating film comprising: a base layer of biaxially oriented polypropylene (BOPP) film and a thermal laminating layer disposed on the surface, wherein the said thermal laminating layer comprises 100% by weight of an ethylene vinyl acetate, copolymer containing from about 10% to about 30% by weight of vinyl acetate units and having melt flow index of 18 to 30. Other type of thermal laminating materials comprising of polyethylene, EAA or a blend of all these.

BRIEF DESCRIPTION OF ACCOMPANYING DRAWINGS

Figure 1:
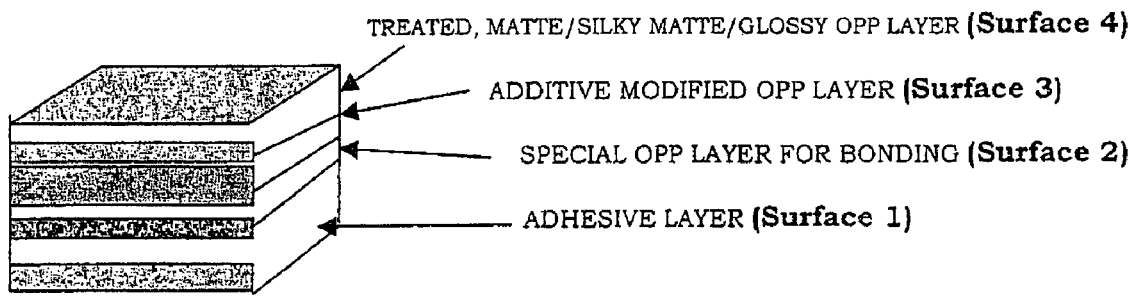

FIG. 1 shows the layer structure of the thermal film.
FIG. 2 shows the schematic diagram of extrusion coating line.

DETAILED DESCRIPTION OF THE INVENTION

It has been discovered unexpectedly that a laminatable multilayered BOPP film may be provided which exhibits excellent thermal lamination properties on a variety of paper based printed substrates including newer ink substrates obtained by more modern digital printing methods. The new and improved thermal laminating film comprises a base layer of a BOPP film having modified surfaces. A thermal laminating layer is disposed on the surface, which comprises 100% by weight of an ethylene vinyl acetate copolymer containing from about 10 to about 30% by weight of vinyl acetate units or polyethylene or EAA or a blend of all these.

In an embodiment, a new and improved method for making a thermal laminating film is provided comprising the steps of: providing a bi-axially oriented polypropylene base layer having modified surfaces.

1. Extrusion coatable surface is modified with m-LLDPE; and thereafter, applying a thermal laminating layer to the same surface. No primer coating and also no ozone treatment is required to achieve the excellent adhesion with EVA copolymer or polyethylene or EAA or a blend of all these due to the modified surface. The thermal laminating layer comprises 100% by weight of an ethylene vinyl acetate copolymer containing from about 10 to about 30% by weight vinyl acetate unit or polyethylene or EAA or a blend of all these.

2. Uncoated surface is modified with the combination of organic and inorganic antiblock for good hot slip, scuff resistance and better antistatic properties.

In an embodiment of the method, the thermal laminating layer is applied onto the surface of the BOPP base layer by extrusion coating methods. In an embodiment, the overall thermal laminating film may have a total thickness of from about 22 to about 80 microns.

In another embodiment, a new and improved method for making the thermal lamination films is performed at lower temperatures than commercially employed such the unwanted thermal history defects in the thermal lamination films can be dramatically reduced or eliminated.

In accordance with preferred embodiment of invention the layer structure of the thermal film is shown in FIG. 1 comprises with the layer of 100% by weight of an ethylene vinyl acetate copolymer containing from about 10 to about 30% by weight of vinyl acetate units and melt index of 18 to 30 or polyethylene or EAA of a blend of all these.

In accordance with the preferred embodiment, depicted in FIG. 1, surface 2 to surface 4 is the base layer of BOPP film before extrusion coating. Surface 2 is the layer given during co-extrusion for manufacturing of bi-axially oriented polypropylene film which is made of special m-LLDPE polymer. Another major advantage, provided by the present invention, is that the surface 2 of multi-layered BOPP thermal laminating films provides excellent bonding with ethylene vinyl acetate or polyethylene or EAA or a blend of all these and does not require any primer coating and ozone treatment.

The surface 3 comprises of antistatic and slip modified core layer for base BOPP film for thermal lamination.

Another specialty of present invention comprises the modified surface morphology for surface 4 which is the uncoated side of the BOPP base film for thermal lamination. It thus improves hot slip, scuff resistance after thermal lamination.

As depicted din FIG. 1, the base layer of BOPP film which is glossy, matte or silky matte varieties (i.e., surface 2 to 4) has a total thickness of about 12-15 micron (shown in Example 1 to 3) and thermal laminating layer of EVA may have a thickness of from about 10 to 70 micron.

The new and improved thermal laminating films provided in accordance with an embodiment of the invention, may be employed in thermal lamination equipment to provide new and improved thermal laminate assemblies. In accordance with this aspect of the invention, new and improved thermal laminate assemblies are provided comprising: a printed substrate, including a surface with printed ink disposed imagewise on the surface. A protective thermoplastic polymer layer is thermally laminated to the printed surface with a thermal laminating layer disposed between the protective layer and the surface. The thermal laminating layer comprises 100% by weight of an ethylene vinyl acetate copolymer containing from about 10% to about 30% by weight of vinyl acetate or polyethylene or EAA or a blend of all these.

In an embodiment, a new and improved method for making a thermal laminate assembly is provided comprising the steps of: preparing a printed substrate to be laminated comprising a substrate having a surface with printed ink disposed image wise on the surface. A thermal laminating film is prepared comprising a protective thermoplastic polymer planer base layer having a surface and a thermal laminating layer disposed on the surface. The thermal laminating layer comprises 100% by weight of ethylene vinyl acetate copolymer containing from about 10 to 30% by weight of vinyl acetate or polyethylene of EAA or a blend of all these. The printed substrate and thermal laminating film are moved relative to each other so that the printed substrate and thermal laminating film are disposed in a registering overlying relationship so that the thermal laminating layer is disposed on the printed surface of the substrate to form a pre-assembly.

Thereafter, the pre-assembly is exposed to conditions of elevated temperature and pressure to effectively bond the thermal laminating film to the surface of the printed substrate to provide the finished thermal laminate assembly product.

Another major advantage, provided by the present invention, is that multi-layered BOPP thermal laminating films do not require any primer coating and ozone treatment to get the excellent bonding with ethylene vinyl acetate.

Another specialty of present invention is that the extrusion coating was possible with such thinner base BOPP film of 12 microns.

Also the specialty of present invention comprises the modified surface morphology on the uncoated surface with good hot slip, scuff resistance and good antistatic properties.

The present invention also provides finished both side thermal laminated assembly products which are fee from locking while stacking in large nos.

The multilayered BOPP thermal laminating film of the present invention has the following advantageous features.

Modified surface to enable thermal lamination with printed paper
No curing period required
Higher productivity
Adhesion with indefinite bond strength
Peel strength between film and paper is excellent
Coloration due to primer will not occur
Excellent optics after lamination Example 1

Glossy Film

| Layer details | Layer thickness (micron) | Raw material | Other details |
|---|---|---|---|
| Skin-1 | 0.75-1.5 | Polypropylene + Combination of inorganic and organic antiblock | Corona treatable surface |
| Core | 9.75-36.0 | Polypropylene + Other functional additives such as slip, antistatic & lubricants | Optimum loading of additive was decided to enable better optics, runnablity etc. |
| Skin-2 | 1.50-2.5 | m-LLDPE + Antiblock | Extrusion coatable surface |
| Coating layer | 10-70 | Low melting polymers from EVA, LLDPE, EAA or a blend of all these. | Laminating adhesive layer. |

Example 2

Matte Film

| Layer details | Layer thickness (micron) | Raw material | Other details |
|---|---|---|---|
| Skin-1 | 2.25-2.50 | Matte compound | Corona Treatable surface |
| Core | 8.25-35.0 | Polypropylene + Other functional additives such as slip, antistatic & lubricants | Optimum loading of additives was decided to enable better optics, runnability etc. |
| Skin-2 | 1.50-2.50 | m-LLDP + Antiblock | Extrusion coatable surface. |
| Coating layer | 10-70 | Low melting polymers from EVA, LLDPE, EAA, or a blend of all these | Laminating adhesive layer |

Example 3

Silky Matte Film

| Layer details | Layer thickness (micron) | Raw material | Other details |
|---|---|---|---|
| Skin-1 | 2.25-2.50 | 30% Matte compound + Homopolymer | Corona treatable surface |

-continued

| Layer details | Layer thickness (micron) | Raw material | Other details |
|---|---|---|---|
| Core | 8.25-35.0 | Polypropylene + Other functional additives such as slip, antistatic & lubricants | Optimum loading of additives was decided to enable better optics, runnability etc. |
| Skin-2 | 1.50-2.50 | m-LLDPE + Antiblock | Extrusion coatable surface. |
| Coating layer | 10-70 | Low melting polymers from EVA, LLDPE, EAA or a blend of all these. | Laminating adhesive layer |

Lamination is for preserving, protecting, enhancing, presenting and displaying the items. Listed below are items that can be laminated.

Preservation:

Greeting Cards/Invitations, Birth/Wedding Certificates, Leaves, Babies Footprints/Report Cards, News Clippings/Magazine Articles, Concert Tickets, Pictures/Poems, Awards, Sketches/Children's Artwork and the like.

Protection:

Menus, Contracts, Maps, Blueprints, Music Sheet and the like.

Enhancement:

Graphs, Flash Cards, Policies, Visual Aids, Business Ads/Business Materials, POP Displays, Charts, Classroom Signs, Instructional Tools, Placemats and the like.

Presentation/Displays:

Regulation Signs, OSHA Signs, EPA Signs, Store Hours, Emergency Instructions, Safety Signs/Guidelines and the like.

TABLE 1

Properties of Glossy thermal lamination film

| PROPERTIES | POSITION | UNITS | ASTM #/ TEST METHOD | GLOSSY THERMAL FILM |
|---|---|---|---|---|
| PHYSICAL DATA | | | | |
| Average Thickness | | micron | D-374-C | 22-80 |
| Wettability (min) [Coated Side] | | dynes/cm | D-2578 | 42 |
| Coefficient of friction [Glossy/Glossy] | | | D-1894 | 2.25-0.30 |
| OPTICAL DATA | | | | |
| Gloss (at 45 degree) [Base Film] | | Gardner | D-2457 | 90 |
| MECHANICAL DATA | | | | |
| Tensile Strength | MD | kg/cm$^2$ | D-882 | 630 |
| | | psi | | 8961 |
| | TD | kg/cm$^2$ | | 1500 |
| | | psi | | 21335 |
| Elongation | MD | % | D-882 | 165 |
| | TD | | | 50 |
| THERMAL DATA | | | | |
| Shrinkage (at 120 degree C., 5 min) | MD | % | D-1204 | 3.00-4.00 |
| | TD | | | 2.00-3.00 |

TABLE 1-continued

Properties of Glossy thermal lamination film

| PROPERTIES | POSITION | UNITS | ASTM #/ TEST METHOD | GLOSSY THERMAL FILM |
|---|---|---|---|---|
| Lamination Temperature | | Degree C. | | 90-130 |
| Lamination pr. | Min. | kg/cm$^2$ | | 4.0 |
| Heat seal initiation | | Degree C. | | 80-100 |

TABLE 2

Properties of Matte thermal laminating film

| PROPERTIES | POSITION | UNITS | ASTM #/ TEST | MATTE THERMAL FILM |
|---|---|---|---|---|
| PHYSICAL DATA | | | | |
| Average Thickness | | micron | D-374-C | 22-80 |
| Wettability (min) | Coated Side/ | dynes/cm | D-2578 | 42 |
| | Matte Side | | | 40 |
| OPTICAL DATA | | | | |
| Gloss (at 45 degree) [Base Film] | | gardner | D-2457 | 10 |
| Haze [Base film] | | % | D-1003 | 70-75 |
| MECHNICAL DATA | | | | |
| Tensile Strength | MD | kg/cm$^2$ | D-882 | 680 |
| | | psi | | 9672 |
| | TD | kg/cm$^2$ | | 1200 |
| | | psi | | 17068 |
| Elongation | MD | % | D-882 | 180 |
| | TD | | | 55 |
| THERMAL DATA | | | | |
| Shrinkage (at 120 degree C., 5 min) | MD | % | D-1204 | 3.00-4.00 |
| | TD | | | 2.00-3.00 |
| Lamination Temperature | | Degree C. | | 90-130 degree C. |
| | | Degree F. | | 194-266 |
| Lamination pr. | Min. | Kg/cm$^2$ | | 4.0 |
| Heat Seal initiation | | Degree C. | | 80-100 |

TABLE 3

Properties of silky matte thermal laminating film

| PROPERTIES | POSITION | UNITS | ASTM #/ TEST METHOD | SILKY MATTE THERMAL FILM |
|---|---|---|---|---|
| PHYSICAL DATA | | | | |
| Average Thickness | | micron | D-374-C | 22-80 |
| Wettability (min) | Coated Side | dynes/cm | D-2578 | 42 |
| | Silky Matte Side | | | 40 |
| OPTICAL DATA | | | | |
| Gloss (at 45 degree) [Base Film] silky matte side | | gardner | D-2457 | 35 |
| MECHNICAL DATA | | | | |
| Tensile Strength | MD | kg/cm² | D-882 | 680 |
| | | psi | | 9672 |
| | TD | kg/cm² | | 1200 |
| | | psi | | 17068 |
| Elongation | MD | % | D-882 | 180 |
| | TD | | | 55 |
| THERMAL DATA | | | | |
| Shrinkage (at 120 degree C., 5 min) | MD | % | D-1204 | 3.00-4.00 |
| | TD | | | 2.00-3.00 |
| Lamination Temperature | | Degree C. | | 90-130 |
| | | Degree F. | | 194-266 |
| Lamination pr. | Min. | Kg/cm² | | 4.0 |
| Heat Seal initiation | | Degree C. | | 80-100 |

As depicted in FIG. 2, there are four basic stages in the extrusion coating process:

1. Resin handling and conditioning
2. Substrate handling and surface preparation
3. Extrusion coating
4. Coated Substrate takeoff Resin Handling and Conditioning:

The production of high quality extrusion coated substrates requires particularly close attention to preventing resin contamination during production, storage, loading and shipment. Since polyolefin resins are non-hygroscopic, they don't require drying prior to being melted in the extruder. Following steps are used in our process to eliminate contamination:

Cleaning all filters in the transfer system periodically

Ensuring that the suction line is not lying on the ground when the system is started. This prevents debris or gravel from entering the system.

Placing air filters over hopper car hatches and bottom valves during unloading to prevent debris or moisture form contaminating the resin.

Initially purging the lines with air and then with a small amount of product prior to filling storage silos or bins. Allow the blowers run several minutes after unloading to clean the lines. This reduces the chance of cross-contamination of product.

Substrate Handling and Surface Preparation:

The extrusion coating process starts with feeding the substrate to the coating rolls from pay-off roll or unwind roll. As the substrate comes off the pay-off roll, the diameter of this roll decreases. Without some compensating force, usually web tension, the decreasing diameter of the pull-off roll would manifest itself in non-uniform tension in the unrolling substrate. Without uniform tension, the coating is inconsistent. Automatic web tension control provided for the unrolling substrate and unwinder roll designs include single roll, non-indexing dual roll, roll frame, dual width turret rollstand, phantom shaft and cantilevered rollstand.

No primer coating is required for good adhesion of coating material (i.e., ethylene vinyl acetate or polyethylene or EAA or a blend of all these) with BOPP film surface. Modification is done during manufacturing of film to avoid priming step and also better bond strength between coating material and base BOPP film.

Extrusion Coating:

To coat a substrate with polyolefin, the resin is first subjected to heat and pressure inside the barrel, or cylinder, of an extruder. Now the molten resin is then forced by the extruder screw through the narrow slit of the extrusion coating die. The slit is straight, and thus, melt emerges as thin film.

This molten film is drawn down from the die into the nip between two rolls below the die—the driven, water cooled chill roll and a rubber covered pressure roll. Here while coming into contact with the faster moving substrate on the rubber-covered pressure roll, hot film is drawn out to the desired thickness, or gauge. The hot film is then forced onto the substrate as both layers are pressed together between the two rolls. The pressure is nearly between 50 to 100 lbs/square inches. The combination of substrate and polyolefin coating is then rapidly cooled by the chill roll.

The extrusion coating machine consists of the following components:

Hopper—Volumetric feeders refill the hopper on a schedule based on the extruder system's output Extruder—The extruder is the single screw type, mounted on top of a carriage consists of:
A gear box
A drive motor
A barrel that encloses a constantly turning, flighted auger screw and several heaters (induction or resistance)
A cooling system on the outside of the barrel
Many thermocouples to measure and control zone temperatures via a control instrument
A valve adapter with a screen pack through which the melt is directed into a flat die.
A melt thermocouple and back pressure transducer for indicating process conditions.

Chill roll—The chill roll has three functions:

In less than one revolution, it solidifies the coating and cools it to a temperature low enough to permit the coated substrate to be rewound.

It's speed controls the coating thickness or coating weight by drawing down the melt film from the die. Speed also controls the economy of the extrusion coating process.

The chill roll surface determines, to a large degree, the surface smoothness of the coating. We have a matte finish roll to give a dull coating surface.

The chill roll is chrome-plated, twin-shell steel drum with an outer shell and inner body containing spiral grooves cooling water. Chill roll water temperature is maintained at 17 to 27 deg. C.

Coated Substrate Take-Off:

After coming off the chill roll, the coated substrate passes through a series of feed rollers before it wound up by the take-off equipment. As the EVA coating melt leaves the extrusion coating slot die and is drawn down in thickness from 15 to 20 micron. With neck-in, a bead usually forms at the edge of the web, thicker than the average coating thickness across the web. The amount of beading depends upon the coating thickness relative to the thickness of the substrate. Here the beading must be trimmed off before the web is rewound. Here the trim portion is carried out by specially designed air suction. The edge trim from the extrusion coating operation is conveyed from coater through pneumatic trim disposal tubes and it is sold as scrap.

Nuclear sensor device is used to measure the coating weights. The sensor reading is used to adjust the die opening Automatically.

Corona treatment on the coated surface done immediately after trimming. The dyne level is maintained at around 52 dynes/cm.

The extrusion coated substrate is wound tightly onto a cardboard tube, called a core. The core is turned by a winder. The winders are characterized by The type of take-up roll drive: center assist The type of roll changing: fully automatic The type of roll stand configuration: back to back.

I claim:

1. A thermal laminating assembly comprising
a printed paper-based substrate including a surface with printing ink disposed image-wise thereon;
a protective thermoplastic polymer layer comprising a biaxially oriented polypropylene (BOPP) film comprising a first outer layer comprising a polypropylene, a matte wax based compound or a combination thereof, a second outer layer comprising a mixture of m-linear low density polyethlene (m-LLDPE) and antiblock additives and a core layer between the first and second outer layers, comprising a mixture of polypropylene and one or more functional additives including slip, antistatic and lubricant, the BOPP film being thermally laminated to the surface with a thermal laminating layer disposed between the protective layer and the surface of the printed paper-based substrate, said thermal laminating layer comprising 100% by weight of an ethylene vinyl acetate copolymer (EVA) or a blend of ethylene vinyl acetate copolymer (EVA) with one or both of polyethylene and ethylene acrylic acid, wherein said copolymer comprises from about 10% to about 30% by weight of vinyl acetate units and said copolymer has a melt flow index of 18 to 30.

2. A process for making a thermal laminate comprising the steps of:
providing a biaxially oriented polypropylene (BOPP) base film comprising a first outer layer comprising a polypropylene, a matte wax based compound or a combination thereof, a second outer layer comprising a mixture of m-linear low density polyethlene (m-LLDPE) and antiblock additives and a core layer between the first and second outer layers, comprising a mixture of polypropylene and one or more functional additives including slip, antistatic and lubricant, the BOPP film being;
extrusion coating an outer surface of the base film with a thermal laminating layer consisting of ethylene vinyl acetate copolymer (EVA) or a blend of ethylene vinyl copolymer (EVA) with one or both of polyethylene and ethylene acrylic acid, wherein said copolymer comprises from about 10% to about 30% by weight of vinyl acetate units and said copolymer has a melt flow index of 18 to 30.

3. A process for making a thermal laminate as claimed in claim 2, wherein the extrusion coating is performed without any application of primer and ozone treatment.

4. A process for making a thermal laminate as claimed in claim 2, further comprising
placing the base film which has been extrusion coated with the thermal laminating layer over a paper-based substrate to form a pre-assembly, and
exposing the pre-assembly to a condition of elevated temperature and pressure to bond the base film and the thermal laminating layer with the paper-based substrate.

5. A biaxially oriented polypropylene (BOPP) film comprising:
a first outer layer comprising a polypropylene, a matte wax based compound, or a combination thereof;
a second outer layer comprising a mixture of m-linear low density polyethylene (m-LLDPE) and antiblock additives; and
a core layer, between the first and second outer layers, comprising a mixture of polypropylene and one or more functional additives including slip, antistatic, and lubricant.

6. The BOPP film as claimed in claim 5, wherein a thermal laminating layer is disposed on the second outer layer by an extrusion coating process without an application of primer and ozone treatment.

7. A thermal laminate for laminating a paper-based substrate, comprising:
a biaxially oriented polypropylene (BOPP) film as a base film having first and second outer surfaces, the BOPP film comprises a first outer layer comprising a polypropylene, a matte wax based compound, or a combination thereof, a second outer layer comprising a mixture of m-linear low density polyethylene (m-LLDPE) and antiblock additives and a core layer between the first and second outer layers, comprising a mixture of polypropylene and one or more functional additives including slip, antistatic, and lubricant; and
a thermal laminating outer layer disposed on the second outer surface of the base film for laminating the base film onto the paper-based substrate, wherein
said thermal laminating outer layer comprises 100% by weight of ethylene vinyl acetate copolymer (EVA) or a blend of ethylene vinyl acetate copolymer (EVA) with one or both of polyethylene and ethylene acrylic acid, wherein said copolymer comprises from 10% to 30% by weight of vinyl acetate units and the said copolymer has a melt flow index of 18 to 30.

8. A thermal laminate as claimed in claim 7, wherein the second outer layer is for a direct extrusion coating of the thermal laminating layer on the base film without any application of primer and ozone treatment.

9. A thermal laminate as claimed in claim 7, wherein the second outer surface of the base film is a glossy or matte or silky matte surface.

10. A thermal laminate as claimed in claim 7 wherein the base film has a thickness in a range of 12 microns to 40 microns.

11. A thermal laminate as claimed in claim 7, wherein the thermal laminating film has a thickness in a range of 22 microns to 80 microns.

12. A thermal laminate as claimed in claim 7, wherein the thermal laminating layer has a thickness in a range of 10 microns to 70 microns.

* * * * *